United States Patent
Caramagno

(10) Patent No.: US 6,401,558 B1
(45) Date of Patent: Jun. 11, 2002

(54) AUTOMATED GEAR CHANGE FOR AN AUTOMOBILE VEHICLE, IN PARTICULAR FOR AN INDUSTRIAL VEHICLE

(75) Inventor: Augusto Caramagno, Turin (IT)

(73) Assignee: Iveco Fiat S.p.A., Via Puglia (IT)

( * ) Notice: Subject to any disclaimer, the term of this patent is extended or adjusted under 35 U.S.C. 154(b) by 0 days.

(21) Appl. No.: 09/524,805

(22) Filed: Mar. 14, 2000

(30) Foreign Application Priority Data

Mar. 16, 1999 (IT) ......................................... TO99A0205

(51) Int. Cl.⁷ ................................................ F16H 3/08
(52) U.S. Cl. ............................. 74/325; 74/335; 74/340; 192/84.1
(58) Field of Search ...................... 74/325, 335, 336 R, 74/333; 192/84.1, 84.31

(56) References Cited

U.S. PATENT DOCUMENTS

| 3,157,259 A | 11/1964 | Bialek ........................ 192/84 |
| 5,592,853 A | * 1/1997 | Rebholz et al. ............... 74/325 |
| 6,044,720 A | * 4/2000 | Matsufuji .................... 74/331 |

FOREIGN PATENT DOCUMENTS

| DE | 04136142 | * 5/1993 |
| DE | 195 00 935 | 7/1995 |
| EP | 0 809 049 | 11/1997 |
| FR | 2 583 489 | 12/1986 |

\* cited by examiner

*Primary Examiner*—Sherry Estremsky
*Assistant Examiner*—Tisha D. Lewis
(74) *Attorney, Agent, or Firm*—Kenyon & Kenyon

(57) ABSTRACT

An automated gear change for an automobile vehicle, in particular for an industrial vehicle, provided with an input shaft, an output shaft, a geared transmission interposed between these input and output shafts and including an auxiliary shaft and a plurality of gears mounted in an angularly idle manner with respect to this output shaft and a plurality of engagement members for each gear that can be selectively actuated in order to make this gear angularly rigid with the output shaft; each engagement member is mounted to slide in a respective pair of seats that face one another and communicate and are associated with the relative gear and, respectively, with the output shaft, and can move between a first disengaged operating position in which it exclusively engages one of the seats and a second engaged operating position in which it engages both the seats; the gear change is further provided with actuation means of electromagnetic type in order to control the displacement of each engagement member between these first and second operating positions.

13 Claims, 2 Drawing Sheets

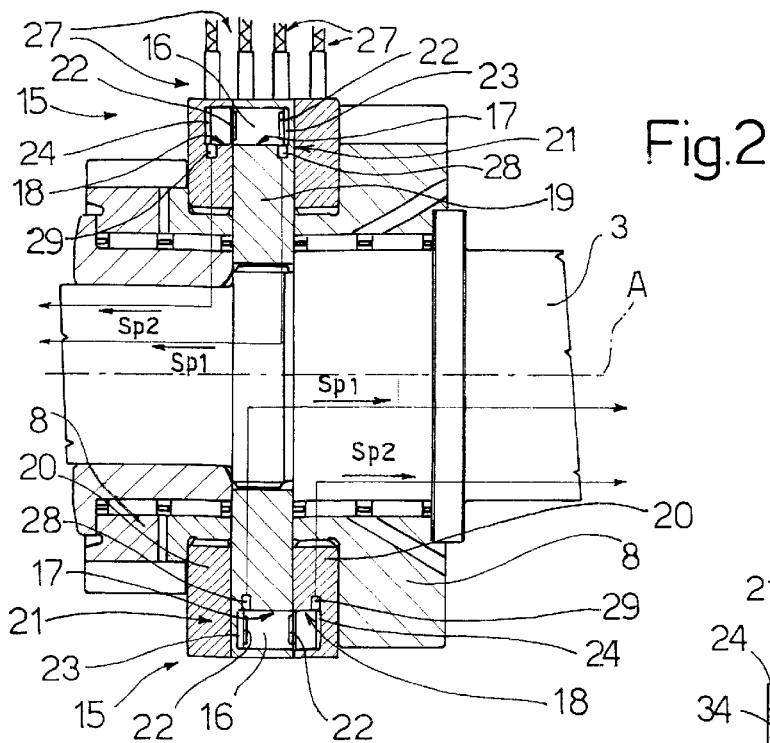
Fig.2
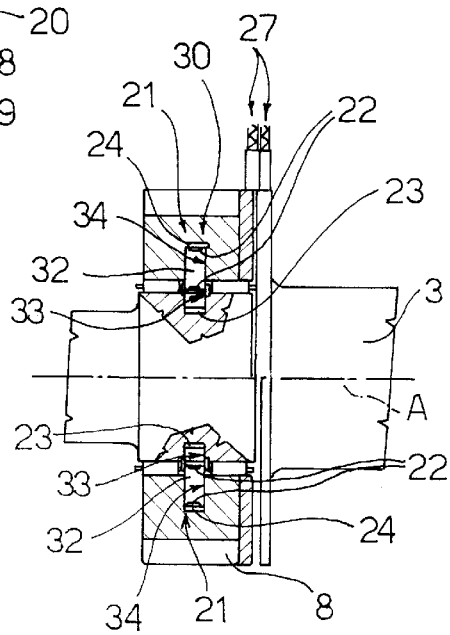
Fig.3
Fig.4

AUTOMATED GEAR CHANGE FOR AN AUTOMOBILE VEHICLE, IN PARTICULAR FOR AN INDUSTRIAL VEHICLE

The present invention relates to an automated gear change for an automobile vehicle, in particular for an industrial vehicle.

BACKGROUND OF THE INVENTION

As is known, a gear change for an automobile vehicle comprises, according to a conventional configuration, an input shaft, an output shaft coaxial with the input shaft and coupled thereto with the possibility of relative rotation, and a geared transmission adapted angularly to connect the output shaft to the input shaft according to a plurality of transmission ratios defining a plurality of gears of the gear change itself.

The geared transmission generally comprises an auxiliary shaft or countershaft parallel to the input and output shafts, a plurality of first gears angularly idle with respect to the output shaft that can be selectively engaged on this output shaft and a plurality of second gears angularly rigid with the auxiliary shaft and coupled angularly to the respective first gears. One of the first gears is normally mounted in an angularly rigid manner on the input shaft and is angularly idle with respect to the output shaft because of its relative mounting between the input and output shafts; the engagement of this first gear on the output shaft makes it possible to provide the direct drive between the input and output shafts.

Known gear changes further comprise a plurality of sliding engagement sleeves interposed between relative pairs of first gears that can be selectively and independently actuated in order to make these first gears angularly rigid with the output shaft; each engagement sleeve is normally disposed in a neutral position, in which it does not interact with the first gears adjacent thereto, and can move between a first operating position in which it is displaced to one side with respect to the above-mentioned neutral position and engages one of the first gears adjacent thereto on the output shaft, and a second operating position in which it is displaced to the opposite side with respect to the neutral position and engages the other gear adjacent thereto on the output shaft.

The engagement sleeves are controlled by respective actuators, generally of pneumatic type, by means of respective actuation forks.

In more detail, the operation of the gear change is controlled by an electronic control unit, which receives a plurality of input signals from a gear selection lever and supplies as output a plurality of control signals for respective electrovalves controlling the actuators.

The automated gear changes of the type described above are in most cases formed by manual gear changes to which actuators and respective control electrovalves for the movement of the engagement sleeves are applied. These gear changes are therefore relatively expensive and complex since they include a relatively large number of components.

SUMMARY OF THE INVENTION

The object of the present invention is to provide an automated gear change for an automobile vehicle, in particular for an industrial vehicle, which makes it possible simply and economically to remedy the above-described drawbacks of known gear changes.

This object is achieved by the present invention which relates to an automated gear change for an automobile vehicle, in particular for an industrial vehicle, comprising:

an input shaft;

an output shaft;

a geared transmission interposed between these input and output shafts and including at least one auxiliary shaft and a plurality of gears mounted in an angularly idle manner with respect to at least one of these shafts;

engagement means associated with each gear that can be selectively actuated in order to make this gear angularly rigid with at least this one shaft;

characterised in that the engagement means comprise, for each gear, at least one engagement member mounted to slide in a first and a second seat that face one another and communicate and are associated with the relative gear and, respectively, with at least this one shaft, and can move between a first disengaged operating position in which it exclusively engages one of the first and second seats and a second engaged operating position in which it engages both the relative first and second seats, the gear change further comprising actuation means of electromagnetic type adapted to control the displacement of each engagement member between these first and second operating positions.

BRIEF DESCRIPTION OF THE DRAWINGS

The invention is described in further detail below with reference to a preferred embodiment thereof, given purely by way of non-limiting example and made with reference to the accompanying drawings, in which:

FIG. 2 shows, in axial section and on an enlarged scale, an engagement device of the gear change of FIG. 1;

FIG. 3 shows, partly in section, a possible variant of the engagement device of FIG. 2;

FIG. 4 shows, partly in section, a further variant of the engagement device of FIG. 2.

DETAILED DESCRIPTION OF THE INVENTION

Figure 1:
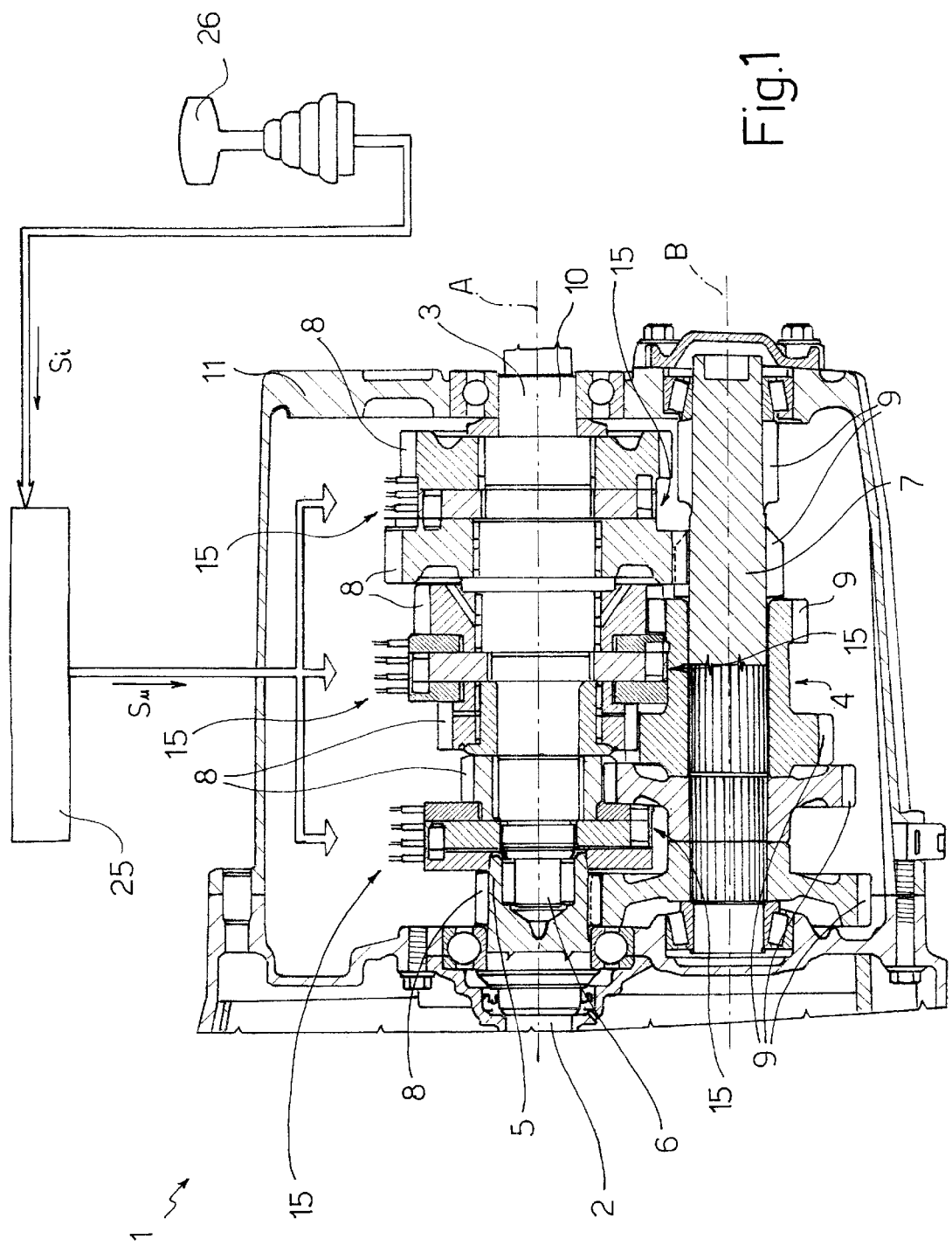
FIG. 1 is an axial section through an automated gear change for an automobile vehicle, in particular for an industrial vehicle, of the present invention.

In FIG. 1, a gear change for an automobile vehicle, in particular for an industrial vehicle, is shown overall by 1.

The gear change 1 comprises an input shaft 2 having a longitudinal axis A and adapted to receive motion from the engine (not shown) of the automobile vehicle via a clutch (not shown), an output shaft 3 coaxial with the input shaft 2 and a geared transmission 4 adapted angularly to connect the output shaft 3 to the input shaft 2 according to a plurality of transmission ratios in turn defining a plurality of gears of the gear change 1.

The input shaft 2 and the output shaft 3 comprise respective ends 5, 6 that are adjacent and coupled to one another with the possibility of relative rotation.

The transmission 4 comprises an auxiliary shaft 7 or countershaft having an axis B parallel to the axis A of the input and output shafts 2, 3, a plurality of first gears 8 angularly idle with respect to the output shaft 3 that can be selectively engaged on this output shaft 3 and a plurality of second gears 9 angularly rigid with the auxiliary shaft 7 and angularly coupled to the respective gears 8.

One of the gears 8 is integrally obtained on the end 5 of the input shaft 2 and therefore, when it is engaged on the output shaft 3, provides the direct drive between the shafts 2 and 3. The other gears 8 are, however, borne by the output shaft 3.

The gear 8 mounted at an end 10 of the output shaft 3 opposite to the end 6 is meshed with an inverting idler gear (not shown) which is in turn coupled to the relative gear 9.

The auxiliary shaft 4 receives the drive torque from the input shaft 2 and transmits it to the output shaft 3 via the pair of gears 8 and 9 engaged with one another.

The input, output and auxiliary shafts 2, 3, 4 are borne in an axially fixed position and in an angularly rotatable manner by an outer housing 11 of the gear change 1 by means of respective bearings.

In FIGS. 1 and 2, the gear change further comprises a plurality of engagement devices 15 of the present invention that can be selectively and independently actuated in order to make the relative gears 8 angularly rigid with the output shaft 3.

Each engagement device 15 in particular r comprises a plurality of engagement members or pins 16 mounted in a sliding manner between respective pairs of seats 17, 18 that are coaxial with one another and communicate and are associated with the output shaft 3 and, respectively, with the relative gear 8 to be engaged and are uniformly distributed about the axis A.

The engagement member s 16 of each engagement device 15 can move between a first operating position, in which they exclusively engage the respective seats 17 associated with the output shaft 3, therefore keeping the relative gear 8 angularly free with respect to this output shaft 3, and a second operating position in which they engage both the respective seats 17, 18, thereby making the relative gear 8 angularly rigid with the output shaft 3.

The seats 17, 18 associated with each engagement device 15 are formed by blind holes having axes parallel to the axis A and are formed on a relative hub 19 angularly rigid with the output shaft 3 and, respectively, on the relative gear 8 adjacent to this hub 19.

In further detail, the output shaft 3 is provided with three hubs 19 interposed between relative pairs of gears 8. Each hub 19 is therefore provided with a first set of seats 17 open towards one of the gears 8 adjacent to this hub 19 and a second set of seats 17 open towards another of the gears 8 adjacent to this hub 19 and angularly alternating with respect to the seats 17 of the first set.

The seats 18 associated with some of the gears 8 are obtained on relative annular members 20 angularly rigid with these gears 8 and axially facing and adjacent to the relative hubs 19.

With particular reference to FIG. 2, the displacement of the engagement members 16 between the first and the second operating position is obtained via actuation means 21 of electromagnetic type.

For each engagement member 16, the actuation means 21 in particular comprise a pair of permanent magnets 22 mounted between respective opposite axial end seats of the engagement member 16 and externally presenting magnetic polarities of opposite sign, and a pair of electromagnetic devices, in this case a pair of electric windings 23, 24, housed at the base of the respective seats 17, 18 of the hub 19 and the relative gear 8 and adapted to generate respective magnetic fields having variable polarity.

The operation of the gear change 1 is controlled by an electronic control unit 25 which receives a plurality of input signals Si from a manual gear selection lever 26 (FIG. 1) and supplies as output a plurality of drive signals Su in current for the windings 23, 24. More precisely, the drive signals Su are supplied to the windings 23, 24 via a plurality of sliding contacts 27 and enable the control of the polarisation of the windings 23, 24 in order to determine the displacement of the engagement members 16.

For each engagement member 16 of a relative engagement device 15, there is further provided a pair of microswitches 28, 29 disposed in the relative seats 17, 18, connected to the control unit 25 and generating respective presence signals Sp1, Sp2 assuming a high logic level (Sp1, Sp2 equal to 1) when the engagement member 16 is disposed in the first and second operating position respectively. In response to the presence signals Sp1, Sp2, the control unit 25 discontinues the electrical supply of the relative windings 23, 24.

In operation, in order to perform a gear change, the control unit 25 generates, in response to a signal Si from the lever 26, drive signals Su for the windings 23, 24 associated with the engagement devices 15 involved by the gear change, so as to disengage those of the gears 8 that define the previously selected gear and therefore to engage those of the gears 8 defining the new gear that is required.

Reference will be made below, for simplicity, to a single gear 8 and relative engagement device 15, as it is evident that the whole of the description of this gear is applicable *mutatis mutandis* to the other gears 8 and relative engagement devices 15.

With particular reference to FIG. 2, the engagement of the gear 8 on the output shaft 3 takes place as follows from a rest configuration, in which this gear 8 is angularly free with respect to the output shaft 3 as the relative engagement members 16 are disposed in the first operating position, i.e. are engaged completely in the relative seats 17 of the respective hub 19 and the relative windings 23, 24 are not supplied with electric current.

The control unit 25 supplies drive signals Su for both the windings 23, 24 associated with each engagement member 16. The windings 23, 24 borne respectively by the hub 19 and the gear 8 generate electromagnetic fields having the same polarity as the magnetic field generated by the permanent magnets 22 adjacent to the windings 23. In this way, an electromagnetic interaction of repulsive type is generated between each winding 23 on the hub 19 and the permanent magnet 22 facing it and disposed on the relative engagement member 16, while an electromagnetic interaction of attractive type is generated between each winding 24 on the gear 8 and the permanent magnet 22 facing it and disposed on the relative engagement member 16. Consequently, as a result of the combined effect of these electromagnetic interactions, the engagement members 16 are displaced towards the gear 8 from the first operating position to the second operating position in which they each engage both the respective seats 17, 18 making this gear 8 angularly rigid with the output shaft 3.

Once the second operating position has been reached, the engagement members 16 actuate the relative microswitches 29, causing the signals Sp2 generated thereby to switch from the low logic level (Sp2 equal to 0) to the high logic level (Sp2 equal to 1). In response to this switching of the signals Sp2, the control unit 25 discontinues the electrical supply of the windings 23, 24.

The shearing stress acting on the engagement members 16 as a result of the load transmitted by the gear 8 to the output shaft 3, makes it possible to maintain these engagement members 16 in their relative second operating positions.

Any accidental and undesired displacement of an engagement member 16 from the second operating position causes the switching of the signal Sp2 generated by the relative microswitch 29 from the high logic level (Sp2 equal to 1) to the low logic level (Sp2 equal to 0); in response to this switching of the signal Sp2, the control unit 25 resets the electrical supply of the relative windings 23, 24 in order to generate an electromagnetic interaction between these windings 23, 24 and the permanent magnets 22 of the engagement member 16 displaced in order to return the latter to the second operating position.

In order to disengage the gear 8 from the output shaft 3, the control unit 25 supplies drive signals Su for both the windings 23, 24 associated with each engagement member 16 such that these windings 23, 24 generate electromagnetic fields having opposite polarity with respect to the preceding case and identical to the polarity of the magnetic field generated by the permanent magnets 22 adjacent to the windings 24. Similarly to what has been described above, an electromagnetic interaction adapted to displace the engagement member 16 towards the hub 19 from the second to the first operating position is generated between the permanent magnets 22 borne by each engagement member 16 and the relative windings 23, 24; in this way, the gear is made angularly free with respect to the output shaft 3.

Once the first operating position has been reached, the engagement members 16 actuate the relative microswitches 28, causing the switching of the signals Sp1 generated thereby from the low logic level (Sp1 equal to 0) to the high logic level (Sp1 equal to 1). In response to this switching of the signals Sp1, the control unit 25 discontinues the electrical supply of the windings 23, 24.

Any accidental and undesired displacement of an engagement member 16 from the first operating position causes the switching of the signal Sp1 generated by the relative microswitch 28 from the high logic level (Sp1 equal to 1) to the low logic level (Sp1 equal to 0); in response to this switching of the signal Sp1, the control unit 25 resets the electrical supply of the relative windings 23, 24 in order to generate an electromagnetic interaction between the windings 23, 24 and the permanent magnets 22 of the engagement member 16 displaced in order to return the latter to the first operating position.

The variants shown in FIGS. 3 and 4 relate to respective engagement devices 30, 31 which are similar to the engagement device 20 and which are described below only with respect to their differences from the engagement devices 20; components identical or corresponding to components already described bear the same reference numerals.

In FIG. 3, the engagement device 30 differs from the engagement devices 20 in that it comprises a plurality of engagement members 32 of the same type as the engagement members 16 mounted to slide in respective pairs of seats 33, 34 facing one another and communicating, and associated with the output shaft 3 and, respectively, with the relative gear 8, uniformly distributed about the axis A and extending radially with respect to this axis A.

The engagement members 32 can move under the thrust of actuation means 21' of electromagnetic type between a first operating position, in which they exclusively engage the relative seats 34 of the respective gear 8 keeping the latter angularly free with respect to the output shaft 3, and a second operating position in which they engage both the respective seats 33, 34 making the gear 8 angularly rigid with the output shaft 3.

The centrifugal force to which the engagement members 32 are subject in operation can be used to retain the latter in the first operating position.

In FIG. 4, the engagement device 31 differs from the engagement device 30 in that, in the first operating position, the engagement members 32 engage the relative seats 33 of the output shaft 3. In this case, the centrifugal force to which the engagement members 32 are subject in operation may be used to facilitate the displacement of the latter from the first to the second operating position.

An examination of the characteristic features of the gear change 1 of the present invention shows the advantages that are provided by this gear change.

In particular, the gear change 1 is relatively simple and economic, since it uses a smaller number of components than the number of components constituting known automated gear changes. More precisely, as a result of the actuation of electromagnetic type of the engagement members 16, the gear change 1 does not require some of the components normally included in known gear changes, such as engagement sleeves, actuation forks, control actuators and relative electrovalves, thereby reducing the overall weight of this gear change 1.

Moreover, the use of engagement devices 30, 31 makes it possible to provide the gear change 1 with a bulk, in the direction of the axes A, B, that is particularly small and lower than the axial bulk of known gear changes.

Lastly, the discontinuation of the electrical supply of the windings 23, 24 in the first and second operating position of the engagement members 16 makes it possible to reduce the wear of the sliding contacts 27.

It is evident that modifications and variants can be made to the gear change 1 provided that they do not depart from the protective scope of the claims.

What is claimed is:

1. An automated gear change (1) for an automobile vehicle, in particular for an industrial vehicle, comprising:
   an input shaft (2);
   an output shaft (3);
   a geared transmission (4) interposed between the input and output shafts (2, 3) and including at least one auxiliary shaft (7) and a plurality of gears (8) mounted in an angularly idle manner with respect to at least one (3) of the input, output and auxiliary shafts (2, 3, 7);
   engagement means (15, 30, 31) associated with each gear (8) that can be selectively actuated in order to make the gear (8) angularly rigid with at least this one (3) of the shafts (2, 3, 7); and
   actuation means (21) of electromagnetic type for actuating the engagement means (15, 30, 31);
      wherein the engagement means (15, 30, 31) includes, for each gear (8), at least one engagement member (16, 32) mounted to slide in a first and a second hole (18, 17; 34, 33) formed in the relative gear (8) and, respectively, in a portion angularly rigid with one (3) of the shafts (2, 3, 7), having respective axes distinct from an axis (A) of one (3) of the shafts (2, 3, 7), and facing one another and communication at prefixed angular positions of the relative gear (8) and the one (3) of the shafts (2, 3, 7), the engagement means (16, 32) being movable, under control of the actuation means (21), between a first disengaged operating position in which it exclusively engages one of the first and second holes (18, 17; 34, 33) and a second engaged operating position in which it engages both the relative first and second holes (18, 17; 34, 33).

2. A gear change as claimed in claim 1, wherein the actuation means (21) includes at least a first magnetic field generator device (22) borne by the relative engagement member (16, 32) and generating a first magnetic field, and a second magnetic field generator device (23, 24) housed in one of the relative first and second holes (18, 17; 34, 33) and generating a second magnetic field interacting with the first magnetic field in order to displace the relative engagement member (16, 32) between the first and the second operating positions, control means (25, 27) being provided in order selectively to vary the magnetic polarity of at least one of the first and second magnetic fields.

3. A gear change as claimed in claim 1, wherein an axis of the first and second holes (34, 33) associated with each gear (8) extend radially with respect to the axis (A) of one (3) of the shafts (2, 3, 7) and the relative axis of the gear (8).

4. A gear change as claimed in claim 1, wherein the engagement means (15) comprise, for each gear (8), a plurality of engagement members (16, 32) mounted to slide in respective first and second holes (18, 17; 34, 33) distributed angularly about the axis (A) of one (3) of the shafts (2, 3, 7).

5. A gear change as claimed in claim 1, wherein the gears (8) are angularly idle with respect to the output shaft (3) and can be selectively engaged on this output shaft (3).

6. A gear change as claimed in claim 2, wherein the actuation means (21) includes two first magnetic field generator devices (22) borne on opposite sides of the relative engagement member (16, 32), and two second magnetic field generator devices (24, 23) housed respectively in the relative first and second holes (18, 17; 34, 33) and disposed on opposite sides of the relative engagement member (16, 32).

7. A gear change as claimed in claim 5, wherein the input and output shafts (2, 3) are mounted coaxially to one another with the possibility of relative movement and in that at least one of the gears (8) is angularly rigid with the input shaft (2).

8. An automated gear change (1) for an automobile vehicle, in particular for an industrial vehicle, comprising:
   an input shaft (2);
   an output shaft (3);
   a geared transmission (4) interposed between these input and output shafts (2, 3) and including at least one auxiliary shaft (7) and a plurality of gears (8) mounted in an angularly idle manner with respect to at least one (3) of the input, output and auxiliary shafts (2, 3, 7);
   engagement means (15, 30, 31) associated with each gear (8) that can be selectively actuated in order to make this gear (8) angularly rigid with at least this one (3) of the input, output and auxiliary shafts (2, 3, 7);
      wherein the engagement means (15, 30, 31) includes, for each gear (8), at least one engagement member (16, 32) mounted to slide in a first and a second seat (18, 17; 34, 33) that face one another and communicate and are associated with the relative gear (8) and, respectively, with at least this one (3) of the input, output and auxiliary shafts (2, 3, 7), and can move between a first disengaged operating position in which it exclusively engages one of the first and second holes (18, 17; 34, 33) and a second engaged operating position in which it engages both the relative first and second holes (18, 17; 34, 33), the gear change (1) further comprising actuation means (21) of electromagnetic type in order to control the displacement of each engagement member (16, 32) between the first and the second operating positions;
      that the actuation means (21) includes at least a first magnetic field generator device (22) borne by the relative engagement member (16, 32) and generating a first magnetic field, and a second magnetic field generator device (23, 24) housed in one of the relative first and second holes (18, 17; 34, 33) and generating a second magnetic field interacting with the first magnetic field in order to displace the relative engagement member (16, 32) between the first and the second operating positions, control means (25, 27) being provided in order selectively to vary the magnetic polarity of at least one of these first and second magnetic field actuation means (21) including two first magnetic field generator devices (22) borne on opposite sides of the relative engagement member (16, 32), and two second magnetic field generator devices (24, 23) housed respectively in the relative first and second holes (18, 17; 34, 33) and disposed on opposite sides of the relative engagement member (16, 32); and
   that the first magnetic field generator devices (22) are permanent magnets housed in respective end holes of the relative engagement member (16, 32) and externally presenting magnetic polarities of opposite sign, and in that the second magnetic field generator devices are electric windings (23, 24) that can be polarised.

9. A gear change as claimed in claim 8, wherein the control means includes an electronic unit (25) receiving a plurality of input (Si) from a manual gear selection lever (26) and generating as output a plurality of drive signals (Su) in current supplied to the windings (23, 24) via a plurality of sliding contacts (27).

10. A gear change as claimed in claim 8, further comprising, for each gear (8), switch means (28, 29) for the electrical supply of the relative windings (23, 24) that can be actuated in the first and second operating positions of the relative engagement member (16, 32).

11. A gear change as claimed in claim 10 wherein the switch means includes a pair of microswitches (28, 29) disposed within the respective first and second holes (18, 17; 34, 33), connected to the control unit (25) and generating respective presence signals (Sp1, Sp2) assuming a first logic level when the relative engagement member (16, 32) is disposed in these first and second operating positions.

12. An automated gear change (1) for an automobile vehicle, in particular for an industrial vehicle, comprising:
   an input shaft (2);
   an output shaft (3);
   a geared transmission (4) interposed between these input and output shafts (2, 3) and including at least one auxiliary shaft (7) and a plurality of gears (8) mounted in an angularly idle manner with respect to at least one (3) of these shafts (2, 3, 7);
   engagement means (15, 30, 31) associated with each gear (8) that can be selectively actuated in order to make this gear (8) angularly rigid with at least this one (3) of the shafts (2, 3, 7);
      wherein the engagement means (15, 30, 31) includes, for each gear (8), at least one engagement member (16, 32) mounted to slide in a first and a second seat (18, 17; 34, 33) that face one another and communicate and are associated with the relative gear (8) and, respectively, with at least this one (3) of the shafts (2, 3, 7), and can move between a first disengaged operating position in which it exclusively engages one of the first and second holes (18, 17; 34, 33) and a second engaged operating position in which it engages both the relative first and second holes (18, 17; 34, 33), the gear change (1) further comprising actuation means (21) of electromagnetic type in order to control the displacement of each engagement member (16, 32) between the first and the second operating positions;

the axis of the first and second holes (18, 17) are parallel to, and are located at a distance from the axis (A) of one (3) of the shafts (2, 3, 7) and the relative gear (8), the second holes (17) being associated with a pair of the gears (8) adjacent to one another being provided on a relative hub (19) angularly rigid with the one (3) of the shafts (2, 3, 7) and interposed between these gears (8).

13. An automated gear change (1) for an automobile vehicle, in particular for an industrial vehicle, comprising:

a n input t shaft (2);

an output shaft (3);

a geared transmission (4) interposed between the input and output shafts (2, 3) and including at least one auxiliary shaft (7) and a plurality of gears (8) mounted in an angularly idle manner with respect to at least one (3) of the input, output and auxiliary shafts (2, 3, 7);

engagement means (15, 30, 31) associated with each gear (8) that can be selectively actuated in order to make the gear (8) angularly rigid with at least this one (3) of the shafts (2,3,7);

the engagement means (15, 30, 31) including , for each gear (8), at least one engagement member (16, 32) mounted to slide in a first and a second seat (18, 17; 34, 33) that face one another and communicate and are associated with the relative gear (8) and, respectively, with at least this one (3) of the shafts (2, 3, 7), and can move between a first disengaged operating position in which it exclusively engages one of the first and second holes (18, 17; 34, 33) and a second engaged operating position in which it engages both the relative first and second holes (18, 17; 34, 33), the gear change (1) further comprising actuation means (21) of electromagnetic type in order to control the displacement of each engagement member (16, 32) between the first and the second operating positions;

the engagement means (15) including for each gear (8), a plurality of engagement members (16, 32) mounted to slide in respective first and second holes (18, 17; 34, 3 3) distributed angularly about the axis of the one (3) of the shafts (2, 3, 7); and each hub (19) has a first set of the second holes (17) open towards one of the gears (8) adjacent thereto, and a second set of these second holes (17) open towards another of the gears (8) adjacent to the hub (19) and angularly alternating with the second holes (17) of the first set.

* * * * *